United States Patent
Nakano

(10) Patent No.: US 10,268,136 B2
(45) Date of Patent: Apr. 23, 2019

(54) OPTICAL SCANNING DEVICE AND IMAGE FORMING APPARATUS PROVIDED WITH SAME

(71) Applicant: KYOCERA Document Solutions Inc., Osaka-shi (JP)

(72) Inventor: Issei Nakano, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/069,208

(22) PCT Filed: Mar. 14, 2017

(86) PCT No.: PCT/JP2017/010215
§ 371 (c)(1),
(2) Date: Jul. 11, 2018

(87) PCT Pub. No.: WO2017/169742
PCT Pub. Date: Oct. 5, 2017

(65) Prior Publication Data
US 2019/0004448 A1    Jan. 3, 2019

(30) Foreign Application Priority Data

Mar. 29, 2016   (JP) ................................. 2016-065738

(51) Int. Cl.
| | |
|---|---|
| G03G 15/00 | (2006.01) |
| G03G 15/04 | (2006.01) |
| B41J 2/47 | (2006.01) |
| H04N 1/113 | (2006.01) |
| G02B 26/12 | (2006.01) |

(52) U.S. Cl.
CPC .......... *G03G 15/04036* (2013.01); *B41J 2/47* (2013.01); *G02B 26/123* (2013.01); *G02B 26/125* (2013.01); *H04N 1/113* (2013.01)

(58) Field of Classification Search
CPC ............ G03G 15/04036; G02B 26/123; G02B 26/125; B41J 2/47; H04N 1/113
See application file for complete search history.

(56) References Cited

U.S. PATENT DOCUMENTS

| | | | |
|---|---|---|---|
| 2003/0179428 A1* | 9/2003 | Suzuki | ..................... B41J 2/473 |
| | | | 359/204.2 |
| 2015/0205097 A1* | 7/2015 | Kudo | ................... G02B 26/123 |
| | | | 347/118 |

FOREIGN PATENT DOCUMENTS

| | | |
|---|---|---|
| JP | 3487482 | 10/2003 |
| JP | 2008-122706 | 5/2008 |

\* cited by examiner

*Primary Examiner* — Hoang X Ngo
(74) *Attorney, Agent, or Firm* — Gerald E. Hespos; Michael J. Porco; Matthew T. Hespos

(57) ABSTRACT

In a first scanning lens, a first lens section and a second lens section are vertically overlapped in such a manner as to separate lens centers thereof by a first distance. In a second scanning lens, a third lens section and a fourth lens section are vertically overlapped in such a manner as to separate lens centers thereof by a second distance equal to the first distance. A vertical positional relationship of the first lens section with the second lens section is the same as a vertical positional relationship of the third lens section with the fourth lens section. Further, a separating direction of a lens center of the first lens section from that of the second lens section is opposite to a separating direction of a lens center of the third lens section from that of the fourth lens section.

6 Claims, 6 Drawing Sheets

FIRST MAIN SCANNING DIRECTION
SECOND REFLECTING DIRECTION ↔ FIRST REFLECTING DIRECTION
SECOND MAIN SCANNING DIRECTION

OPTICAL SCANNING DEVICE AND IMAGE FORMING APPARATUS PROVIDED WITH SAME

TECHNICAL FIELD

The present invention relates to an optical scanning device for scanning the peripheral surface of each of a plurality of photoconductive drums with a light beam and an image forming apparatus provided with the same.

BACKGROUND ART

An optical scanning device used in an image forming apparatus such as a color printer includes incident optical systems for four colors of YCMBk including light sources for emitting light beams, a polygon mirror for reflecting the light beams incident thereon from these incident optical systems and scanning the peripheral surfaces of photoconductive drums and scanning lenses for imaging the light beams on the peripheral surfaces. In an optical scanning device required to be compact and low in cost, one polygon mirror is commonly used for light beams of four colors. In such an optical scanning device, a counter scanning method is employed in which two scanning lenses each corresponding to the incident optical systems of two colors are arranged across a polygon mirror. In this case, light beams of two colors are incident on one deflection surface of the polygon mirror and light beams of the remaining two colors are incident on another deflection surface.

An optical scanning device of a counter scanning type is disclosed in Publication of Japanese Patent No. 3487482 in which incident optical systems are arranged such that an angle formed by an optical axis of a light beam incident on a deflection surface of a polygon mirror and an optical axis of the light beam propagating from this deflection surface toward the peripheral surface of a photoconductive drum (hereinafter, referred to as an "incident open angle") differs in each of incident optical systems of two colors. However, in the optical scanning device having such a configuration, the incident open angle changes if an optical housing housing optical components is thermally deformed due to an environmental variation such as an internal temperature increase caused by the continuous operation of an image forming apparatus. If the incident open angle changes, a reflection point on the polygon mirror with respect to the scanning lens varies, with the result that the deterioration of imaging performance of the scanning lens on the peripheral surface of the photoconductive drum is caused. If imaging performance is deteriorated in this way, a color shift occurs in a formed color image, leading to a quality reduction of the color image.

Among optical scanning devices configured such that light beams of two colors are caused to be incident on one deflection surface of a polygon mirror at different incident open angles, Japanese Unexamined Patent Publication No. 2008-122706 discloses an optical scanning device using scanning lenses formed by vertically overlapping two lenses in such a manner as to be shifted from each other in a main scanning direction. The shapes of the two scanning lenses facing each other across the polygon mirror are in a relationship mirror-inverted with respect to each other. Specifically, in each of the two scanning lenses, a separating direction of a lens center of the upper lens from that of the lower lens is the same. In the optical scanning device having such a configuration, the deterioration of imaging performing of the scanning lenses on the peripheral surfaces of the photoconductive drums can be suppressed, but two scanning lenses having different shapes are used. Thus, common use of components cannot be achieved for two scanning lenses facing each other across the polygon mirror and, along with that, a reduction of component production man-hours also cannot be achieved.

SUMMARY OF INVENTION

The present invention aims to provide an optical scanning device of a counter scanning type in which two scanning lenses are arranged to face each other across a polygon mirror, the optical scanning device being capable of suppressing the deterioration of imaging performance of the scanning lenses on photoconductive drum peripheral surfaces and enabling common use of components of these scanning lenses, and an image forming apparatus provided with the same.

An optical scanning device according to one aspect of the present invention is an optical scanning device for scanning peripheral surfaces of a first photoconductive drum, a second photoconductive drum, a third photoconductive drum and a fourth photoconductive drum rotating about drum rotary shafts with light beams. This optical scanning device includes a casing including a base part having a principal surface parallel to the drum rotary shafts, and a polygon mirror arranged in a first area on the principal surface of the base part, including a mirror rotary shaft extending in a direction perpendicular to the principal surface, a first deflection surface and a second deflection surface, first and second light beams being incident on the first deflection surface at the same timing, third and fourth light beams being incident on the second deflection surface at the same timing, and configured to scan the peripheral surfaces of the respective first and second photoconductive drums in a first main scanning direction by reflecting the first and second light beams in a first reflecting direction and scan the peripheral surfaces of the respective third and fourth photoconductive drums in a second main scanning direction opposite to the first main scanning direction by reflecting the third and fourth light beams in a second reflecting direction opposite to the first reflecting direction while rotating about the motor rotary shaft, incident optical systems arranged in a second area outside the first area in the first or second main scanning direction on the principal surface of the base part, a first scanning lens arranged in a third area outside the first area in the first reflecting direction on the principal surface of the base part and extending along the first main scanning direction, and a second scanning lens arranged in a fourth area outside the first area in the second reflecting direction on the principal surface of the base part and extending along the second main scanning direction. The incident optical systems includes a first incident optical system configured to cause the first light beam to be incident at a first incident open angle on the first deflection surface, a second incident optical system arranged adjacent to the first incident optical system and configured to cause the second light beam to be incident at a second incident open angle larger than the first incident open angle on the first deflection surface, a third incident optical system arranged adjacent to the second incident optical system on a side opposite to the first incident optical system and configured to cause the third light beam to be incident at a third incident open angle equal to the second incident open angle on the second deflection surface, and a fourth incident optical system arranged adjacent to the third incident optical system on a side opposite to the second incident optical system and configured to cause the fourth light beam to be incident at a fourth incident open angle equal to the first incident open angle on the second deflection surface. The first scanning lens includes a first lens section configured to cause the first light beam reflected by the polygon mirror to be imaged on the peripheral surface of the first photoconductive drum and a second lens section configured to cause the second light beam reflected by the polygon mirror to be imaged on the peripheral surface of the second photoconductive drum, and is formed by vertically overlapping the first and second lens sections in such a manner as to separate lens centers of the first and second lens sections by a first distance in the first main scanning direction. The second scanning lens includes a third lens section configured to cause the third light beam reflected by the polygon mirror to be imaged on the peripheral surface of the third photoconductive drum and a fourth lens section configured to cause the fourth light beam reflected by the polygon mirror to be imaged on the peripheral surface of the fourth photoconductive drum, and is formed by vertically overlapping the third and fourth lens sections in such a manner as to separate lens centers of the third and fourth lens sections by a second distance equal to the first distance in the second main scanning direction. A vertical positional relationship of the first lens section with the second lens section is the same as that of the third lens section with the fourth lens section, and a separating direction of the first lens section from the second lens section along the main scanning direction is opposite to a separating direction of the third lens section from the fourth lens section along the main scanning direction.

An image forming device according to another aspect of the present invention includes a first photoconductive drum, a second photoconductive drum, a third photoconductive drum and a fourth photoconductive drum configured to rotate about drum rotary shafts, and the above optical scanning device configured to irradiate peripheral surfaces of the first, second, third and fourth photoconductive drums with light beams.

According to the present invention, in an optical scanning device of a counter scanning type in which two scanning lenses are arranged to face each other across a polygon mirror, it is possible to suppress the deterioration of imaging performance of the scanning lenses on photoconductive drum peripheral surfaces and achieve common use of components of these scanning lenses.

DESCRIPTION OF EMBODIMENT

Figure 1:
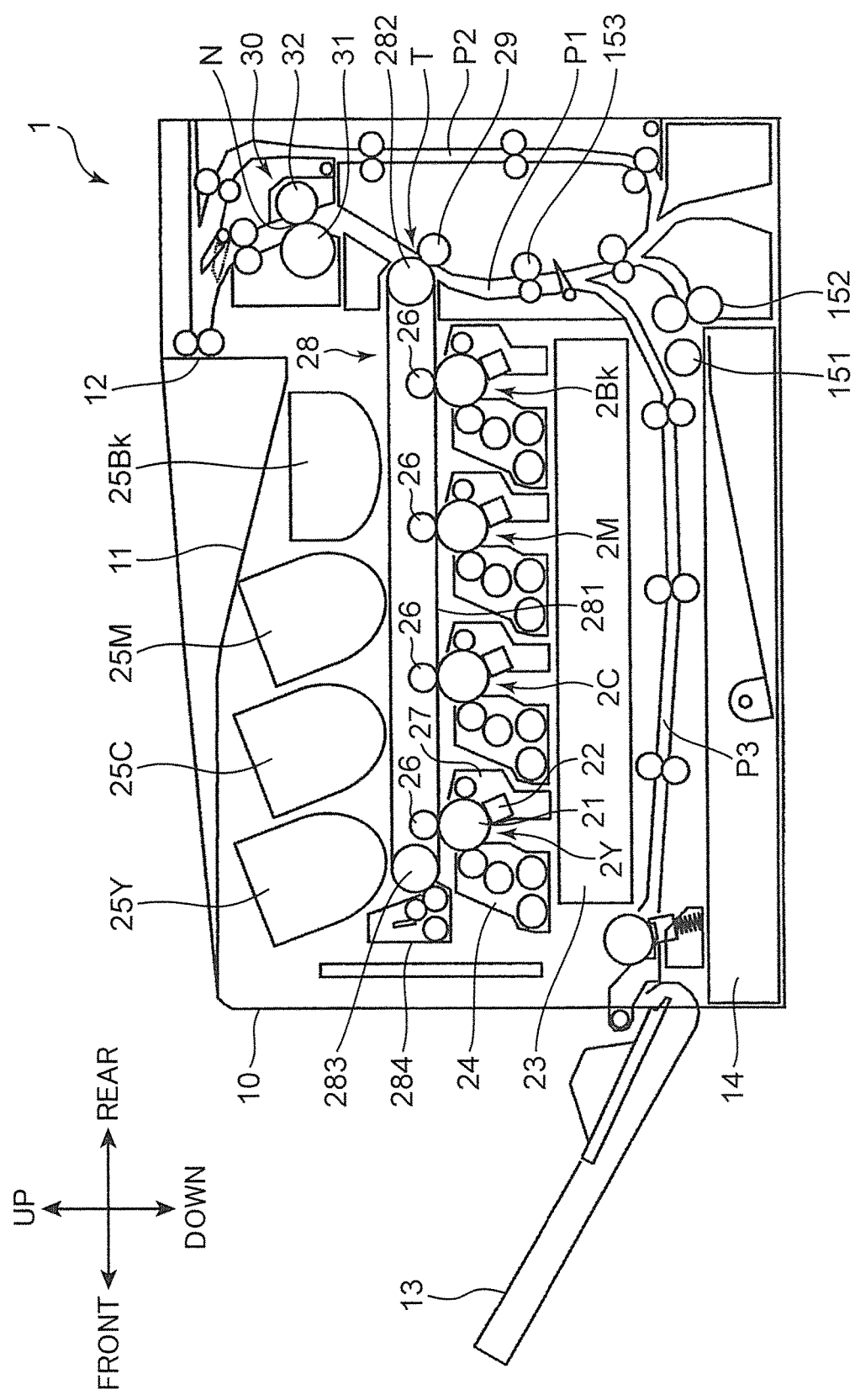
FIG. 1 is a sectional view showing a schematic configuration of an image forming apparatus according to one embodiment of the present invention.

Hereinafter, an optical scanning device and an image forming apparatus according to one embodiment of the present invention are described on the basis of the drawings. FIG. 1 is a sectional view showing a schematic configuration of an image forming apparatus 1 according to the one embodiment of the present invention. The image forming apparatus 1 is a tandem color printer and includes a body housing 10 formed of a substantially rectangular parallelepiped housing. Note that the image forming apparatus may be a full-color copier or complex machine.

The body housing 10 houses a plurality of processing units for performing an image forming process on a sheet inside. In this embodiment, image forming units 2Y, 2C, 2M and 2Bk, an optical scanning device 23, an intermediate transfer unit 28 and a fixing device 30 are included as the processing units. A sheet discharge tray 11 is provided on the upper surface of the body housing 10. A sheet discharge port 12 is open to face the sheet discharge tray 11. A manual feed tray 13 is openably and closably mounted on a side wall of the body housing 10. A sheet cassette 14 for storing sheets, to which the image forming process is applied, is detachably mounted in a lower part of the body housing 10.

The image forming units 2Y, 2C, 2M and 2Bk are for forming toner images of respective colors of yellow (Y), cyan (C), magenta (M) and black (Bk) based on image information transmitted from an external apparatus such as a computer, and tandemly arranged at predetermined intervals in a horizontal direction. Each image forming unit 2Y, 2C, 2M, 2Bk includes a photoconductive drum 21 having a cylindrical shape to carry an electrostatic latent image and a toner image, a charger 22 for charging the peripheral surface of the photoconductive drum 21, a developing device 24 for forming a toner image by applying developer to the electrostatic latent image, a toner container 25Y, 25C, 25M, 25Bk of yellow, cyan, magenta, black for supplying toner of each color to the developing device 24, a primary transfer roller 26 for primarily transferring the toner image formed on the photoconductive drum 21 and a cleaning device 27 for removing the residual toner on the peripheral surface of the photoconductive drum 21.

Note that, in the following description, the photoconductive drum provided in the image forming unit 2Y is referred to as a "first photoconductive drum 21Y", the photoconductive drum provided in the image forming unit 2C is referred to as a "second photoconductive drum 21C", the photoconductive drum provided in the image forming unit 2M is referred to as a "third photoconductive drum 21M" and the photoconductive drum provided in the image forming unit 2Bk is referred to as a "fourth photoconductive drum 21Bk" in the case of particularly describing the photoconductive drum 21 provided in each image forming unit 2Y, 2C, 2M, 2Bk.

The optical scanning device 23 forms an electrostatic latent image on the peripheral surface of the photoconductive drum 21 of each color. The optical scanning device 23 of this embodiment includes a plurality of light sources prepared for each color and imaging optical systems for imaging and scanning light beams emitted from these light sources on and across the peripheral surfaces of the photoconductive drums of the respective colors. The imaging optical systems of the respective colors are not optical systems independent of each other and are partially commonly used. This optical scanning device 23 is described in detail later.

The intermediate transfer unit 28 primarily transfers toner images formed on the photoconductive drums 21. The intermediate transfer unit 28 includes a transfer belt 281 configured to rotate in contact with the peripheral surface of each photoconductive drum 21, and a drive roller 282 and a driven roller 283 between which the transfer belt 281 is mounted. The transfer belt 281 is pressed against the peripheral surface of each photoconductive drum 21 by the primary transfer roller 26. The toner image on the photoconductive drum 21 of each color is primarily transferred in a superimposing manner at the same position on the transfer belt 281. In this way, a full-color toner image is formed on the transfer belt 281.

A secondary transfer roller 29 forming a secondary transfer nip portion T is arranged to face the drive roller 282 across the transfer belt 281. The full-color toner image on the transfer belt 281 is secondarily transferred onto a sheet at the secondary transfer nip portion T. The toner remaining on the peripheral surface of the transfer belt 281 without being transferred onto the sheet is collected by a belt cleaning device 284 arranged to face the driven roller 283.

The fixing device 30 includes a fixing roller 31 having a built-in heat source and a pressure roller 32 forming a fixing nip portion N together with the fixing roller 31. The fixing device 30 applies a fixing process of fusing the toner to the sheet by heating and pressing the sheet, to which the toner image was transferred thereto in the secondary transfer nip portion T, in the fixing nip portion N. The sheet having the fixing process applied thereto is discharged toward the sheet discharge tray 11 from the sheet discharge port 12.

A sheet conveyance path for conveying the sheet is provided inside the body housing 10. The sheet conveyance path includes a main conveyance path P1 vertically extending from the vicinity of the lower part to the vicinity of an upper part of the body housing 10 by way of the secondary transfer nip portion T and the fixing device 30. A downstream end of the main conveyance path P1 is connected to the sheet discharge port 12. A reversing conveyance path P2 for reversing and conveying the sheet at the time of double-sided printing extends from a most downstream end to the vicinity of an upstream end of the main conveyance path P1. Further, a conveyance path P3 for manually fed sheet extending from the manual feed tray 13 to the main conveyance path P1 is arranged above the sheet cassette 14.

The sheet cassette 14 includes a sheet storing portion for storing a bundle of sheets. A pickup roller 151 for picking up the uppermost sheet of the sheet bundle one by one and a pair of feed rollers 152 for feeding the sheet to the upstream end of the main conveyance path P1 are provided near a right-upper side of the sheet cassette 14. A sheet placed on the manual feed tray 13 is also fed to the upstream end of the main conveyance path P1 through the conveyance path P3 for manually fed sheet. A pair of registration rollers 153 for feeding the sheet to the transfer nip portion at a predetermined timing are arranged upstream of the secondary transfer nip portion T in the main conveyance path P1.

In the case of performing a single-sided printing (image forming) process on a sheet, the sheet is fed to the main conveyance path P1 from the sheet cassette 14 or the manual feed tray 13, and a toner image transfer process is applied to the sheet in the secondary transfer nip portion T and a fixing process is applied to fix the transferred toner to the sheet in the fixing device 30. Thereafter, the sheet is discharged onto the sheet discharge tray 11 from the sheet discharge port 12. On the other hand, in the case of performing a double-sided printing process on the sheet, after the transfer process and the fixing process are applied to one side of the sheet, the sheet is partially discharged onto the sheet discharge tray 11 from the sheet discharge port 12. Thereafter, the sheet is switched back and conveyed, and returned to the vicinity of the upstream end of the main conveyance path P1 by way of the reversing conveyance path P2. Thereafter, the transfer process and the fixing process are applied to the other side of the sheet and the sheet is discharged onto the sheet discharge tray 11 from the sheet discharge port 12.

Figure 2:
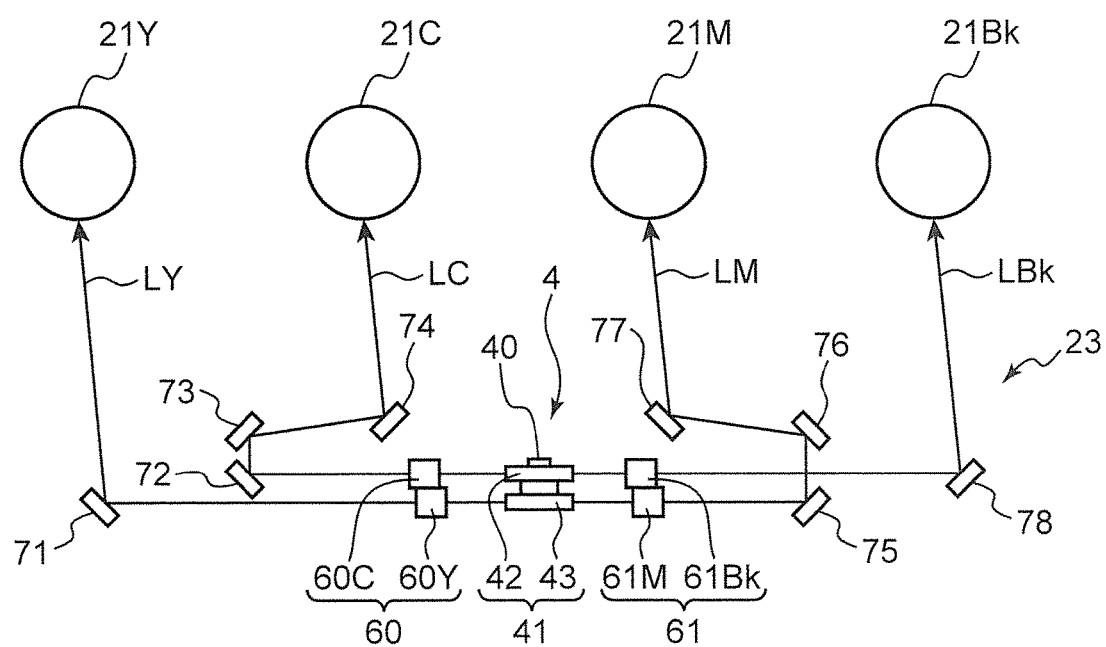
FIG. 2 is an optical path diagram schematically showing the configuration of a sub-scanning cross-section of an optical scanning device.
Figure 3:
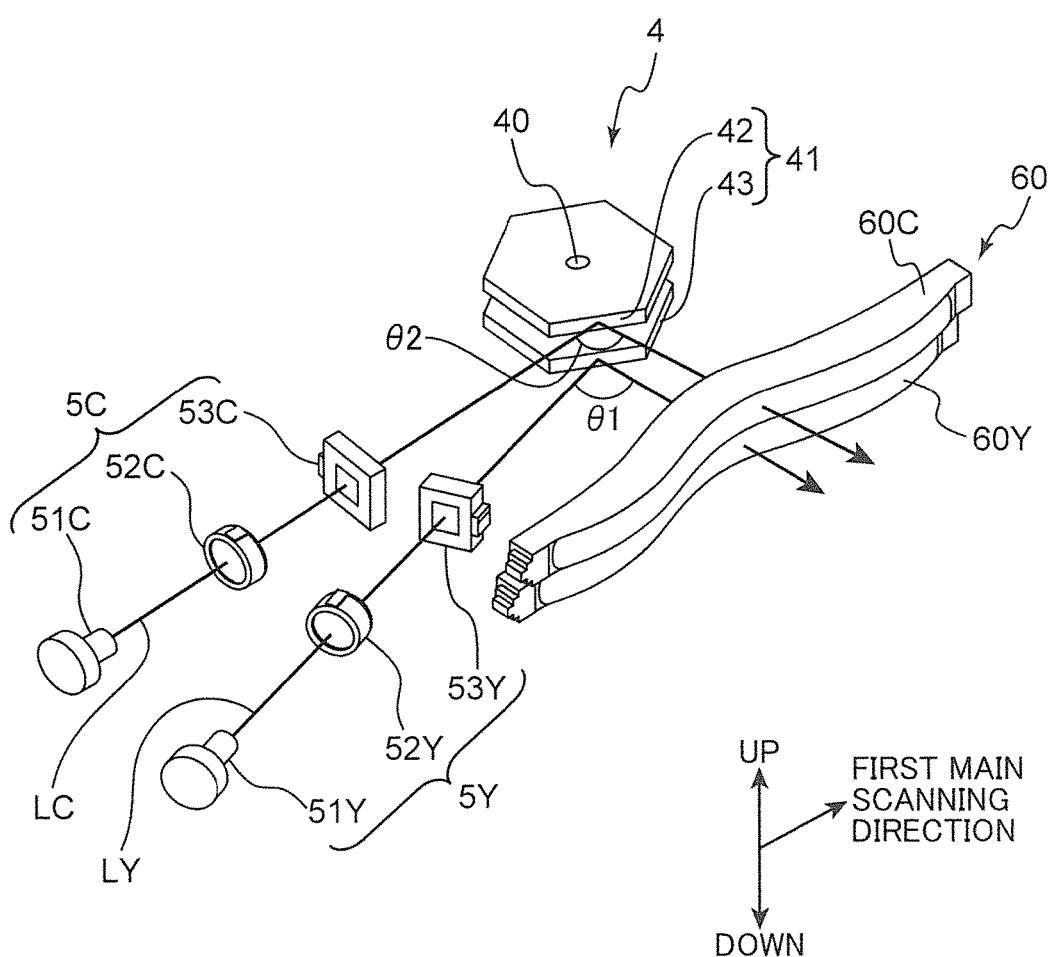
FIG. 3 is a perspective view of an essential part of the optical scanning device.
Figure 4:
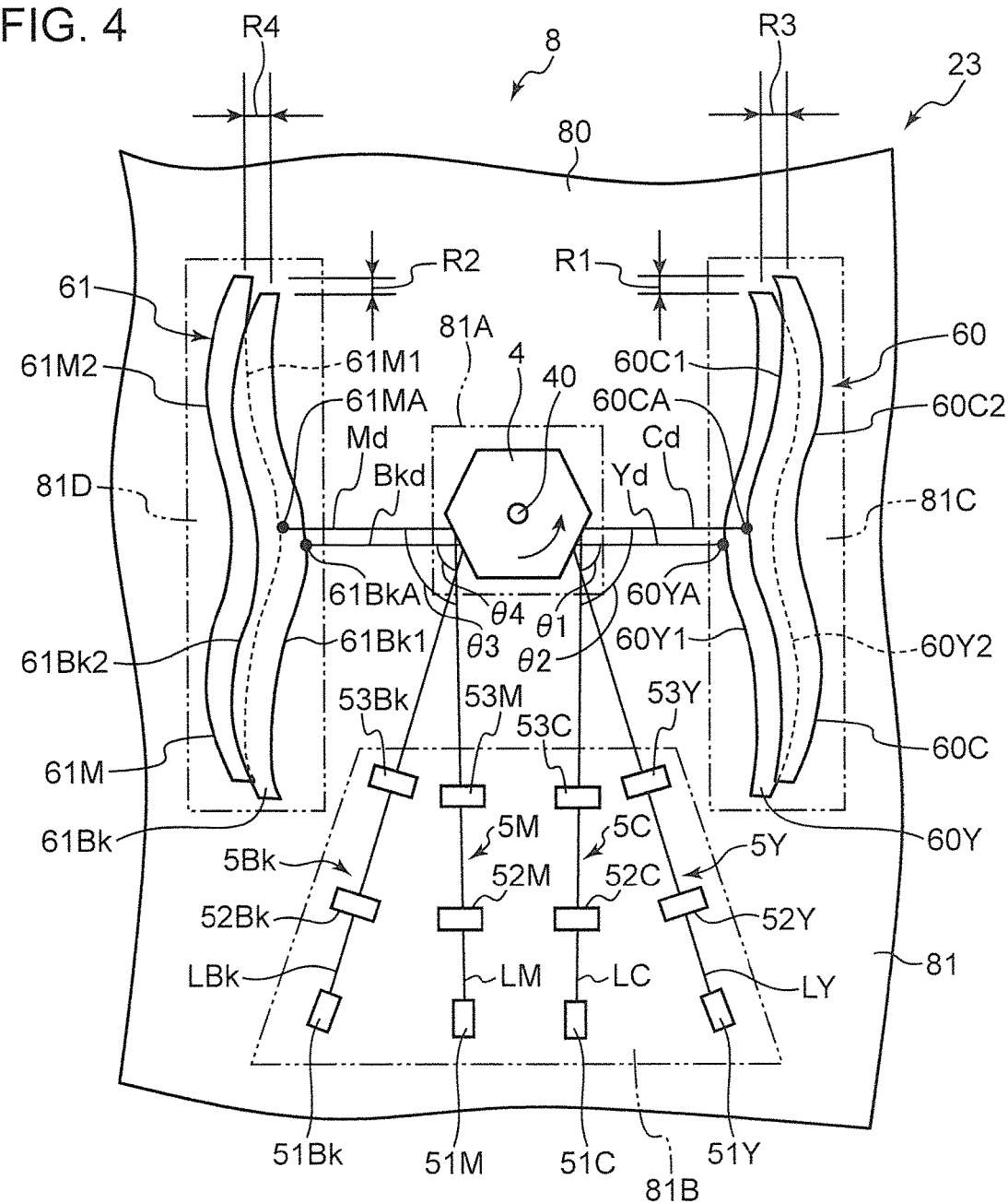
FIG. 4 is a diagram showing the arrangements of lens sections in a first scanning lens and a second scanning lens.

Next, the optical scanning device 23 according to this embodiment is further described in detail. FIG. 2 is an optical path diagram schematically showing the configuration of a sub-scanning cross-section of the optical scanning device 23, and FIG. 3 is a perspective view of an essential part of the optical scanning device 23. Further, FIG. 4 is a diagram showing the arrangements of lens sections in a first scanning lens 60 and a second scanning lens 61. The optical scanning device 23 scans the peripheral surfaces of the first photoconductive drum 21Y for yellow, the second photoconductive drum 21C for cyan, the third photoconductive drum 21M for magenta and the fourth photoconductive drum 21Bk for black respectively with a yellow light beam LY (first light beam) which is a laser light beam for drawing a yellow image, a cyan light beam LC (second light beam) which is a laser light beam for drawing a cyan image, a magenta light beam LM (third light beam) which is a laser light beam for drawing a magenta image and a black light beam LBk (fourth light beam) which is a laser light beam for drawing a black image.

The optical scanning device 23 includes a first incident optical system 5Y, a second incident optical system 5C, a third incident optical system 5M and a fourth incident optical system 5Bk respectively arranged on optical paths of the light beams of the respective colors as incident optical systems, one polygon mirror 4 commonly used for four colors, the first and second scanning lenses 60, 61 arranged to face each other across the polygon mirror 4, reflection mirrors 71 to 78 for irradiating the light beams of the respective colors to the peripheral surfaces of the respective photoconductive drums 21Y, 21C, 21M and 21Bk and an optical housing 8 (casing) housing these. In this embodiment, the first scanning lens 60 functioning as a scanning optical system for yellow and cyan and the second scanning lens 61 functioning as a scanning optical system for magenta and black are arranged to face each other across the polygon mirror 4. That is, the optical scanning device of this embodiment is a device of a counter scanning type in which one polygon mirror 4 is commonly used by two sets of scanning optical systems each for two colors arranged to face each other. FIG. 3 shows a perspective view of one of these two sets of the scanning optical systems each for two colors.

The optical housing 8 is a substantially rectangular parallelepiped housing and includes a base part 80 having a principal surface 81 parallel to drum rotary shafts of the respective photoconductive drums 21Y, 21C, 21M and 21Bk and side wall parts (not shown) standing on the principal surface 81.

The polygon mirror 4 is a polygonal mirror formed with six deflection surfaces 41 along each side of a regular hexagon, and arranged in a first area 81A on the principal surface 81 of the base part 80 of the optical housing 8. The polygon mirror 4 includes a mirror rotary shaft 40 extending in a direction perpendicular to the principal surface 81 of the base part 80, a first deflection surface on which yellow and cyan light beams LY, LC can be incident at the same timing and a second deflection surface on which magenta and black light beams LM and LBk can be incident at the same timing. An output shaft of an unillustrated polygon motor is coupled to the mirror rotary shaft 40.

By driving and rotating the polygon motor, the polygon mirror 4 reflects the yellow and cyan light beams LY, LC incident on one deflection surface 41 (first deflection surface) from each of the first and second incident optical system 5Y, 5C to be described later in a first reflecting direction at one scanning time and scans the peripheral surfaces of the respective first and second photoconductive drums 21Y, 21C in a first main scanning direction while rotating about the mirror rotary shaft 40. Further, the polygon mirror 4 reflects the magenta and black light beams LM, LBk incident on another deflection surface 41 (second deflection surface) facing the one deflection surface 41 from each of the third and fourth incident optical system 5M, 5Bk to be described later in a second reflecting direction opposite to the first reflecting direction at the same scanning timing as the one scanning time and scans the peripheral surfaces of the respective third and fourth photoconductive drums 21M, 21Bk in a second main scanning direction opposite to the first main scanning direction while rotating about the mirror rotary shaft 40.

Note that, in this embodiment, the deflection surface 41 of the polygon mirror 4 is separated into an upper deflection surface 42 and a lower deflection surface 43 as shown in FIGS. 2 and 3. Here, the yellow and magenta light beams LY, LM are incident on the lower deflection surfaces 43 and the cyan and black light beams LC, LBk are incident on the upper deflection surfaces 42. Of course, the yellow and magenta light beams LY, LM may be incident on the upper deflection surfaces 42 and the cyan and black light beams LC, LBk may be incident on the lower deflection surfaces 43. The polygon mirror 4 is configured to have the divided upper and lower deflection surfaces 42, 43 in this way to reduce the weight of the polygon mirror 4 by lightening middle parts of the deflection surfaces 41 actually not used for the reflection of light beams. The deflection surfaces 41 may also be simple flat surfaces including no lightened middle part.

The first, second, third and fourth incident optical systems 5Y, 5C, 5M and 5Bk serving as the incident optical systems are arranged in a second area 81B outside the first area 81A, where the polygon mirror 4 is arranged, in the first or second main scanning direction on the principal surface 81 of the base part 80 of the optical housing 8. In this embodiment, the second area 81B where the first, second, third and fourth incident optical systems 5Y, 5C, 5M and 5Bk are arranged is an area outside the first area 81A in the second main scanning direction on the principal surface 81 of the base part 80 as shown in FIG. 4.

The first incident optical system 5Y is an incident optical system for causing the yellow light beam LY to be incident on the deflection surfaces 41 of the polygon mirror 4 and includes a laser unit 51Y, a collimator lens 52Y and a cylindrical length 53Y. The laser unit 51Y includes a laser element serving as a first light source for emitting a yellow light beam LY to be irradiated to the peripheral surface of the first photoconductive drum 21Y. The collimator lens 52Y converts the yellow light beam LY emitted from the laser unit 51Y and diffusing into parallel light. The cylindrical lens 53Y converts the parallel light into linear light long in the first main scanning direction and images the linear light on the deflection surfaces 41 of the polygon mirror 4 (lower deflection surfaces 43 in this embodiment).

The second incident optical system 5C is an incident optical system for causing the cyan light beam LC to be incident on the deflection surfaces 41 of the polygon mirror 4 and arranged adjacent to the first incident optical system 5Y in the second area 81B of the principal surface 81 of the base part 80. The second incident optical system 5C includes a laser unit 51C having a laser element serving as a second light source for emitting a cyan light beam LC to be irradiated to the peripheral surface of the second photoconductive drum 21C, and a collimator lens 52C and a cylindrical length 53C exhibiting functions similar to the above ones. The collimator lens 52C converts the cyan light beam LC emitted from the laser unit 51C and diffusing into parallel light. The cylindrical lens 53C converts the parallel light into linear light long in the first main scanning direction and images the linear light on the deflection surfaces 41 of the polygon mirror 4 (upper deflection surfaces 42 in this embodiment).

The first and second incident optical system 5Y, 5C for causing the light beams to be incident on the deflection surface 41 (first deflection surface) of the polygon mirror 4 at the same scanning timing are arranged to have different incident open angles with respect to one deflection surface 41 (first deflection surface) of the polygon mirror 4 as shown in FIGS. 3 and 4. This makes it unnecessary to arrange the first and second incident optical systems 5Y, 5C at the same position in the optical housing 8 and a degree of freedom in the arrangement of optical components can be secured.

An angle formed by an optical axis along which the yellow light beam LY is incident on the deflection surface 41 of the polygon mirror 4 and an optical axis of the beam propagating from the deflection surface 41 toward the peripheral surface of the first photoconductive drum 21Y is a first incident open angle $\theta 1$. Specifically, the first incident optical system 5Y causes the yellow light beam LY to be incident at the first incident open angle $\theta 1$ on the deflection surface 41 of the polygon mirror 4. On the other hand, an angle formed by an optical axis along which the cyan light beam LC is incident on the deflection surface 41 of the polygon mirror 4 and an optical axis of the beam propagating from the deflection surface 41 toward the peripheral surface of the second photoconductive drum 21C is a second incident open angle $\theta 2$ larger than the first incident open angle $\theta 1$. Specifically, the second incident optical system 5C causes the cyan light beam LC to be incident at the second incident open angle $\theta 2$ on the deflection surface 41 of the polygon mirror 4. In this embodiment, the first incident open angle $\theta 1$ is set at 75° and the second incident open angle $\theta 2$ is set at 90°.

The third incident optical system 5M is an incident optical system for causing the magenta light beam LM to be incident on the deflection surfaces 41 of the polygon mirror 4 and arranged on a side of the second incident optical system 5C opposite to the first incident optical system 5Y in the second area 81B of the principal surface 81 of the base part 80. The third incident optical system 5M includes a laser unit 51M having a laser element serving as a third light source for emitting a magenta light beam LM to be irradiated to the peripheral surface of the third photoconductive drum 21M, a collimator lens 52M and a cylindrical length 53M. The collimator lens 52M converts the magenta light beam LM emitted from the laser unit 51M and diffusing into parallel light. The cylindrical lens 53M converts the parallel light into linear light long in the second main scanning direction and images the linear light on the deflection surfaces 41 of the polygon mirror 4 (lower deflection surfaces 43 in this embodiment).

The fourth incident optical system 5Bk is an incident optical system for causing the black light beam LBk to be incident on the deflection surfaces 41 of the polygon mirror 4 and arranged on a side of the third incident optical system 5M opposite to the second incident optical system 5C in the second area 81B of the principal surface 81 of the base part 80. The fourth incident optical system 5Bk includes a laser unit 51Bk having a laser element serving as a fourth light source for emitting a black light beam LBk to be irradiated to the peripheral surface of the fourth photoconductive drum 21Bk, a collimator lens 52Bk and a cylindrical length 53Bk. The collimator lens 52Bk converts the black light beam LBk emitted from the laser unit 51Bk and diffusing into parallel light. The cylindrical lens 53Bk converts the parallel light into linear light long in the second main scanning direction and images the linear light on the deflection surfaces 41 of the polygon mirror 4 (upper deflection surfaces 42 in this embodiment).

The third and fourth incident optical system 5M, 5Bk for causing the light beams to be incident on the other deflection surface 41 (second deflection surface) of the polygon mirror 4 facing the one deflection surface 41 at the same scanning timing are arranged to have different incident open angles with respect to the other deflection surface 41 (second deflection surface) of the polygon mirror 4 as shown in FIGS. 3 and 4. This makes it unnecessary to arrange the third and fourth incident optical systems 5M, 5Bk at the same position in the optical housing 8 and a degree of freedom in the arrangement of optical components can be secured.

An angle formed by an optical axis along which the magenta light beam LM is incident on the deflection surface 41 of the polygon mirror 4 and an optical axis of the beam propagating from the deflection surface 41 toward the peripheral surface of the third photoconductive drum 21M is a third incident open angle θ3 equal to the second incident open angle θ2. Specifically, the third incident optical system 5M causes the magenta light beam LM to be incident at the third incident open angle θ3 on the deflection surface 41 of the polygon mirror 4. On the other hand, an angle formed by an optical axis along which the black light beam LBk is incident on the deflection surface 41 of the polygon mirror 4 and an optical axis of the beam propagating from the deflection surface 41 toward the peripheral surface of the fourth photoconductive drum 21Bk is a fourth incident open angle θ4 equal to the first incident open angle θ1. Specifically, the fourth incident optical system 5Bk causes the black light beam LBk to be incident at the fourth incident open angle θ4 on the deflection surface 41 of the polygon mirror 4. In this embodiment, the third incident open angle θ3 is set at 90° and the fourth incident open angle θ4 is set at 75°.

The first scanning lens 60 is a lens having such a distortion (fθ characteristic) that an angle of an incident light beam and an image height are in a proportional relationship and long along the first main scanning direction. This first scanning lens 60 is arranged in a third area 81C outside the first area 81A, where the polygon mirror 4 is arranged, in the first reflecting direction on the principal surface 81 of the base unit 80 of the optical housing 8. The first scanning lens 60 includes a first lens section 60Y for condensing the yellow light beam LY reflected by the polygon mirror 4 and imaging the condensed yellow light beam LY on the peripheral surface of the first photoconductive drum 21Y, and a second lens section 60C for condensing the cyan light beam LC reflected by the polygon mirror 4 and imaging the condensed cyan light beam LC on the peripheral surface of the second photoconductive drum 21C. As shown in FIG. 4, the first scanning lens 60 is formed by vertically overlapping the first and second lens sections 60Y, 60C in such a manner as to separate lens centers of the first and second lens sections 60Y, 60C by a first distance R1 in the first main scanning direction.

In this embodiment, in the first scanning lens 60, the first lens section 60Y is arranged below and the second lens section 60C is arranged above, and the upper surface of the first lens section 60Y and the lower surface of the second lens section 60C are in contact. Further, in the first scanning lens 60, the lens center of the lower first lens section 60Y is located on a side proximate to the respective incident optical systems 5Y, 5C, 5M and 5Bk with respect to the lens center of the upper second lens section 60C. Specifically, in the first scanning lens 60, a separating direction of the lens center of the first lens section 60Y from that of the second lens section 60C parallel to the first main scanning direction coincides with an approaching direction to the respective incident optical system 5Y, 5C, 5M and 5Bk.

Similarly to the first scanning lens 60, the second scanning lens 61 is a lens having such a distortion (fθ characteristic) that an angle of an incident light beam and an image height are in a proportional relationship and long along the second main scanning direction. This second scanning lens 61 is arranged in a fourth area 81D outside the first area 81A, where the polygon mirror 4 is arranged, in the second reflecting direction on the principal surface 81 of the base unit 80 of the optical housing 8. In other words, the second scanning lens 61 is arranged to face the first scanning lens 60 across the polygon mirror 4. The second scanning lens 61 includes a third lens section 61M for condensing the magenta light beam LM reflected by the polygon mirror 4 and imaging the condensed magenta light beam LM on the peripheral surface of the third photoconductive drum 21M, and a fourth lens section 61Bk for condensing the black light beam LBk reflected by the polygon mirror 4 and imaging the condensed black light beam LBk on the peripheral surface of the second photoconductive drum 21Bk. As shown in FIG. 4, the second scanning lens 61 is formed by vertically overlapping the third and fourth lens sections 61M, 61Bk in such a manner as to separate lens centers of the third and fourth lens sections 61M, 61Bk by a second distance R2 equal to the first distance R1 in the second main scanning direction.

In this embodiment, in the second scanning lens 61, the third lens section 61M is arranged below and the second lens section 61Bk is arranged above, and the upper surface of the third lens section 61M and the lower surface of the fourth lens section 61Bk are in contact. Further, in the second scanning lens 61, the lens center of the lower third lens section 61M is located on a side away from the respective incident optical system 5Y, 5C, 5M and 5Bk with respect to the lens center of the upper fourth lens section 61Bk. Specifically, in the second scanning lens 61, a separating direction of the lens center of the third lens section 61M from that of the fourth lens section 61Bk parallel to the second main scanning direction coincides with a retreating direction from the respective incident optical system 5Y, 5C, 5M and 5Bk.

Further, in this embodiment, the lens centers of the first and second lens sections 60Y, 60C are separated by a third distance R3 in the first reflecting direction in the scanning lens 60. The lens center of the lower first lens section 60Y is located on a side proximate to the polygon mirror 4 with respect to the lens center of the upper second lens section 60C. Specifically, in the first scanning lens 60, a separating direction of the lens center of the first lens section 60Y from that of the second lens section 60C parallel to the first reflecting direction coincides with an approaching direction to the polygon mirror 4. Further, in the second scanning lens 61, the lens centers of the third and fourth lens sections 61M, 61Bk are separated by a fourth distance R4 equal to the third distance R3 in the second reflecting direction. The lens center of the lower third lens section 61M is located on a side away from the polygon mirror 4 with respect to the lens center of the upper fourth lens section 61Bk. Specifically, in the second scanning lens 61, a separating direction of the lens center of the third lens section 61M from that of the fourth lens section 61Bk parallel to the second reflecting direction coincides with a retreating direction from the polygon mirror 4.

The arrangement of the first and second lens sections 60Y, 60C in the first scanning lens 60 and the arrangement of the third and fourth lens sections 61M, 61Bk in the second scanning lens 61 are described in detail with reference to FIG. 4.

The first lens section 60Y in the first scanning lens 60 and the first incident optical system 5Y are arranged with respect to the polygon mirror 4 such that the yellow light beam LY is reflected at a reflection point present at a specific position of the deflection surface 41 of the polygon mirror 4 and passes through a position on an optical axis of the first lens section 60Y (first incident open angle $\theta 1=75°$). The first lens section 60Y has an incident surface 60Y1 and an exit surface 60Y2. The yellow light beam LY reflected at the reflection point on the deflection surface 41 of the polygon mirror 4 passes through an on-axis point 60YA located on the optical axis of the incident surface 60Y1. In an optical path of the yellow light beam LY, the first lens section 60Y of the first scanning lens 60 is arranged in the second area 81B on the principal surface 81 of the base unit 80 such that the on-axis point 60YA is positioned at a downstream end of an optical path Yd between the polygon mirror 4 having a length determined in design and the first lens section 60Y.

The second lens section 60C in the first scanning lens 60 and the second incident optical system 5C are arranged with respect to the polygon mirror 4 such that the cyan light beam LC is reflected at a reflection point present at a specific position of the deflection surface 41 of the polygon mirror 4 and passes through a position on an optical axis of the second lens section 60C (second incident open angle $\theta 2=90°$). Due to a difference in incident open angle, an optical path Cd between the polygon mirror 4 and the second lens section 60C in an optical path of the cyan light beam C is shifted toward a downstream side with respect to the optical path Yd for yellow in a rotating direction of the polygon mirror 4. That is, when the deflection surface 41 is rotated toward the downstream side in the rotating direction by a predetermined angle of rotation after the yellow light beam LY is reflected at the reflection point on the deflection surface 41 of the polygon mirror 4, the cyan light beam LC is reflected at the reflection point on the deflection surface 41 of the polygon mirror 4. Note that lengths of the optical paths Yd, Cd are equal.

The second lens section 60C has an incident surface 60C1 and an exit surface 60C2. The cyan light beam LC reflected at the reflection point on the deflection surface 41 of the polygon mirror 4 passes through an on-axis point 60CA located on an optical axis of an incident surface 60C1. In an optical path of the cyan light beam LC, the second lens section 60C is overlapped on the first lens section 60Y arranged in the second area 81B on the principal surface 81 of the base unit 80 such that the on-axis point 60CA is positioned at a downstream end of the optical path Cd in the optical path of the cyan light beam LC.

The third lens section 61M in the second scanning lens 61 and the third incident optical system 5M are arranged with respect to the polygon mirror 4 such that the magenta light beam LM is reflected at a reflection point present at a specific position of the deflection surface 41 of the polygon mirror 4 and passes through a position on an optical axis of the third lens section 61M (third incident open angle $\theta 3=90°$). The third lens section 61M has an incident surface 61M1 and an exit surface 61M2. The magenta light beam LM reflected at the reflection point on the deflection surface 41 of the polygon mirror 4 passes through an on-axis point 61MA located on an optical axis of the incident surface 61M1. In an optical path of the magenta light beam LM, the third lens section 61M of the second scanning lens 61 is arranged in the second area 81B on the principal surface 81 of the base unit 80 such that the on-axis point 61MA is positioned at a downstream end of an optical path Md between the polygon mirror 4 having the length determined in design and the third lens section 61M.

The fourth lens section 61Bk in the second scanning lens 61 and the fourth incident optical system 5Bk are arranged with respect to the polygon mirror 4 such that the black light beam LBk is reflected at a reflection point present at a specific position of the deflection surface 41 of the polygon mirror 4 and passes through a position on an optical axis of the fourth lens section 61Bk (fourth incident open angle $\theta 4=75°$). Due to a difference in incident open angle, an optical path Bkd between the polygon mirror 4 and the fourth lens section 61Bk in the optical path of the cyan light beam Bk is shifted toward a downstream side with respect to the optical path Md for magenta in the rotating direction of the polygon mirror 4. That is, when the deflection surface 41 is rotated toward the downstream side in the rotating direction by a predetermined angle of rotation after the magenta light beam LM is reflected at the reflection point on the deflection surface 41 of the polygon mirror 4, the black light beam LBk is reflected at the reflection point on the deflection surface 41 of the polygon mirror 4. Note that lengths of the optical paths Md, Bkd are equal.

The fourth lens section 61Bk has an incident surface 61Bk1 and an exit surface 61Bk2. The black light beam LBk reflected at the reflection point on the deflection surface 41 of the polygon mirror 4 passes through an on-axis point 61BkA located on an optical axis of an incident surface 61Bk1. In the optical path of the black light beam LBk, the fourth lens section 61Bk is overlapped on the third lens section 61M arranged in the second area 81B on the principal surface 81 of the base unit 80 such that the on-axis point 61BkA is positioned at a downstream end of the optical path Bkd.

As described above, in the optical scanning device 23 configured such that two light beams are caused to be incident at different incident open angles on one deflection surface 41 of the polygon mirror 4, the first and second scanning lenses 60, 61 arranged to face each other across the polygon mirror 4 are configured by vertically overlapping two lens sections in such a manner as to separate the lens centers of the two lens sections by a predetermined distance, whereby the deterioration of imaging performance of the respective scanning lenses 60, 61 on the respective photoconductive drums 21Y, 21C, 21M and 21Bk can be suppressed.

Next, the shape of the first scanning lens 60 formed by vertically overlapping the first and second lens sections 60Y, 60C and the shape of the second scanning lens 61 formed by vertically overlapping the third and fourth lens sections 61M, 61Bk are described in detail.

In this embodiment, the first and second scanning lenses 60, 61 have the following features in shape. A first feature is, as described above, that the first distance R1 between the lens centers of the first and second lens sections 60Y, 60C in the first scanning lens 60 in the main scanning direction and the second distance R2 between the lens centers of the third and fourth lens sections 61M, 61Bk in the second scanning lens 61 are equal.

A second feature is that a vertical positional relationship of the first lens section 60Y with the second lens section 60C in the first scanning lens 60 and that of the third lens section 61M with the fourth lens section 61Bk in the second scanning lens 61 are same. As described above, the first lens section 60Y is on the upper side in the first scanning lens 60 and the third lens section 61M is on the lower side in the second scanning lens 61.

A third feature is that the separating direction of the lens center of the first lens section 60Y from that of the second lens section 60C along the main scanning direction in the first scanning lens 60 is opposite to the separating direction of the lens center of the third lens section 61M from that of the fourth lens section 61Bk along the main scanning direction in the second scanning lens 61. As described above, the separating direction of the lens center of the first lens section 60Y from that of the second lens section 60C along the main scanning direction in the first scanning lens 60 coincides with the approaching direction to the respective incident optical systems 5Y, 5C, 5M and 5Bk, whereas the separating direction of the lens center of the third lens section 61M from that of the fourth lens section 61Bk along the main scanning direction in the second scanning lens 62 coincides with the retreating direction from the respective incident optical systems 5Y, 5C, 5M and 5Bk.

A fourth feature is, as described above, that the third distance R3 between the lens centers of the first and second lens sections 60Y, 60C in the reflecting direction in the first scanning lens 60 and the fourth distance R4 between the third and fourth lens sections 61M, 61Bk in the reflecting direction in the second scanning lens 61 are equal.

A fifth feature is that the separating direction of the lens center of the first lens section 60Y from that of the second lens section 60C along the reflecting direction in the first scanning lens 60 is the same direction as the separating direction of the lens center of the third lens section 61M from that of the fourth lens section 61Bk along the reflecting direction in the second scanning lens 61. As described above, the separating direction of the lens center of the first lens section 60Y from that of the second lens section 60C along the main scanning direction in the first scanning lens 60 coincides with the approaching direction to the polygon mirror 4, whereas the separating direction of the lens center of the third lens section 61M from that of the fourth lens section 61Bk along the main scanning direction in the second scanning lens 61 coincides with the retreating direction from the polygon mirror 4.

The first and second scanning lenses 60, 61 having the first to fifth features described above are in such a relationship that the shapes thereof match each other when being rotated by 180° about an axis parallel to the main scanning direction with the first and second scanning lenses 60, 61 arranged to face each other across the polygon mirror 4. Specifically, when the first scanning lens 60 is rotated by 180° about the axis parallel to the main scanning direction, it can be used as the second scanning lens 61. Thus, common use of components between the first and second scanning lenses 60, 61 can be achieved and, along with that, a reduction of component production man-hours can also be achieved.

Further, in this embodiment, the first and second lens sections 60Y, 60C may be integrally formed in the first scanning lens 60, and the third and fourth lens sections 61M, 61Bk may be integrally formed in the second scanning lens 61. By such a configuration, the first and second scanning lenses 60, 61 can have excellent imaging performance on the peripheral surfaces of the respective photoconductive drums 21Y, 21C, 21M and 21Bk.

Figure 5:
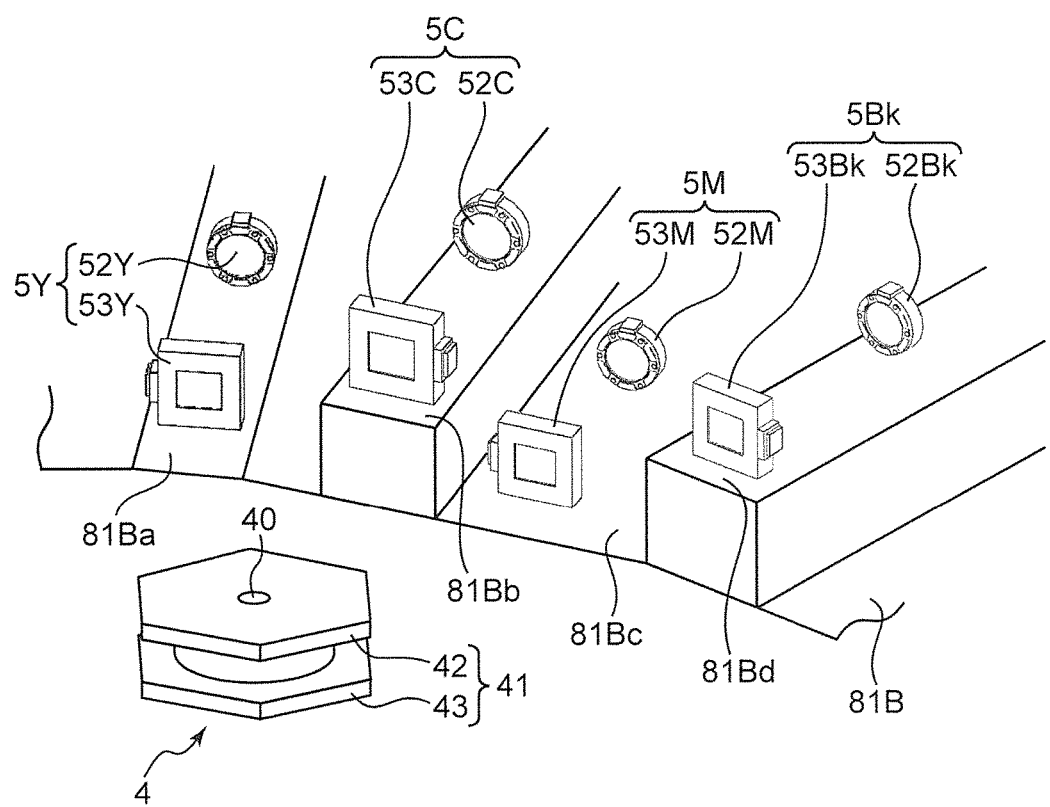
FIG. 5 is a perspective view showing a first example of the configuration of an area of a principal surface of a base part of an optical housing where incident optical systems are arranged.

Next, the shape of the second area 81B, where the respective incident optical systems 5Y, 5C, 5M and 5Bk are arranged, on the principal surface 81 of the base part 80 of the optical housing 8 is described in detail with reference to FIG. 5. FIG. 5 is a perspective view showing a first example of the configuration of the second area 81B, where the respective incident optical systems 5Y, 5C, 5M and 5Bk are arranged, on the principal surface 81 of the base part 80 of the optical housing 8.

In the example shown in FIG. 5, the second area 81B of the principal surface 81 of the base part 80 includes a first area part 81Ba where the first incident optical system 5Y is arranged, a second area part 81Bb where the second incident optical system 5C is arranged, a third area part 81Bc where the third incident optical system 5M is arranged and a fourth area part 81Bd where the fourth incident optical system 5Bk is arranged.

In the second area 81B of the principal surface 81 of the base part 80, the first and second area parts 81Ba, 81Bb are different in vertical position and the third and fourth area parts 81Bc, 81Bd are different in vertical position. Specifically, in the second area 81B of the principal surface 81 of the base part 80, the first and third area parts 81Ba, 81Bc are formed on the principal surface 81 and the second and fourth area parts 81Bb, 81Bd project upward from the principal surface 81 and are formed as projecting parts extending straight along a radial direction of the polygon mirror 4. Further, the second and fourth area parts 81Bb, 81Bd formed as the projecting parts have the same shape. Specifically, the second and fourth area parts 81Bb, 81Bd have the same length in a longitudinal direction, length in a width direction perpendicular to the longitudinal direction, projecting height and cross-sectional shape perpendicular to the longitudinal direction. Note that the second and fourth area parts 81Bb, 81Bd have, for example, a rectangular cross-sectional shape. A vertical positional relationship of the first area part 81Ba with the second area part 81Bb is the same as that of the first lens section 60Y with the second lens section 60C. Further, a vertical positional relationship of the third area part 81Bc with the fourth area part 81Bd is the same as that of the third lens section 61M with the fourth lens section 61Bk.

In this embodiment, the first area part 81Ba is located lower than the second area part 81Bb formed as the projecting part to correspond to the arrangement of the first scanning lens 60 that the first lens section 60Y is on the lower side and the second lens section 60C is on the upper side. Further, the third area part 81Bc is located lower than the fourth area part 81Bd formed as the projecting part to correspond to the arrangement of the second scanning lens 61 that the third lens section 61M is on the lower side and the fourth lens section 61Bk is on the upper side. Specifically, the second area 81B on the principal surface 81 of the base part 80 where the first, second, third and fourth incident optical systems 5Y, 5C, 5M and 5Bk are arranged side by side in this order is formed such that the first and third area parts 81Ba, 81Bc are located lower than the second and fourth area parts 81Bb, 81Bd serving as the projecting parts to correspond to the vertical positional relationships of the respective lens sections in the first and second scanning lenses 60, 61.

By configuring the second area 81B, where the respective incident optical systems 5Y, 5C, 5M and 5Bk are arranged, on the principal surface 81 of the base part 80 as described above, the optical path of the yellow light beam LY from the first incident optical system 5Y to the deflection surface 41 of the polygon mirror 4 and the optical path of the yellow light beam LY from the deflection surface 41 of the polygon motor 4 to the first lens section 60Y of the first scanning lens 60 coincide in the vertical positional relationship. Further, the optical path of the cyan light beam LC from the second incident optical system 5C to the deflection surface 41 of the polygon mirror 4 and the optical path of the cyan light beam LC from the deflection surface 41 of the polygon motor 4 to the second lens section 60C of the first scanning lens 60 coincide in the vertical positional relationship. Furthermore, the optical path of the magenta light beam LM from the third incident optical system 5M to the deflection surface 41 of the polygon mirror 4 and the optical path of the magenta light beam LM from the deflection surface 41 of the polygon motor 4 to the third lens section 61M of the second scanning lens 61 coincide in the vertical positional relationship. Further, the optical path of the black light beam LBk from the fourth incident optical system 5Bk to the deflection surface 41 of the polygon mirror 4 and the optical path of the black light beam LBk from the deflection surface 41 of the polygon motor 4 to the fourth lens section 61Bk of the second scanning lens 61 coincide in the vertical positional relationship.

By the above configuration, even if the optical housing 8 is thermally deformed due to an environmental variation or the like, the variation of the reflection points on the polygon motor 4 with respect to the respective scanning lenses 60, 61 can be suppressed and the deterioration of imaging performance of the respective scanning lenses 60, 61 on the respective photoconductive drums 21Y, 21C, 21M and 21Bk can be suppressed. Further, in the second area 81B on the principal surface 81 of the base part 80, the second and fourth area parts 81Bb, 81Bd formed as the projecting parts have the same shape. For example, if the second and fourth area parts 81Bb, 81Bd are focused, the peripheral shapes thereof are similarly configured. Thus, in the second area 81B on the principal surface 81 of the base part 80, the first area part 81Ba where the first incident optical system 5Y is arranged and the third area part 81Bc where the third incident optical system 5M is arranged, the both area parts having the same vertical position, have a small thermal deformation difference, and the second area part 81Bc where the second incident optical system 5M is arranged and the fourth area part 81Bd where the fourth incident optical system 5Bk is arranged also have a small thermal deformation difference. Thus, the deterioration of optical scanning characteristics due to the thermal deformation of the optical housing 8 can be suppressed.

Figure 6:
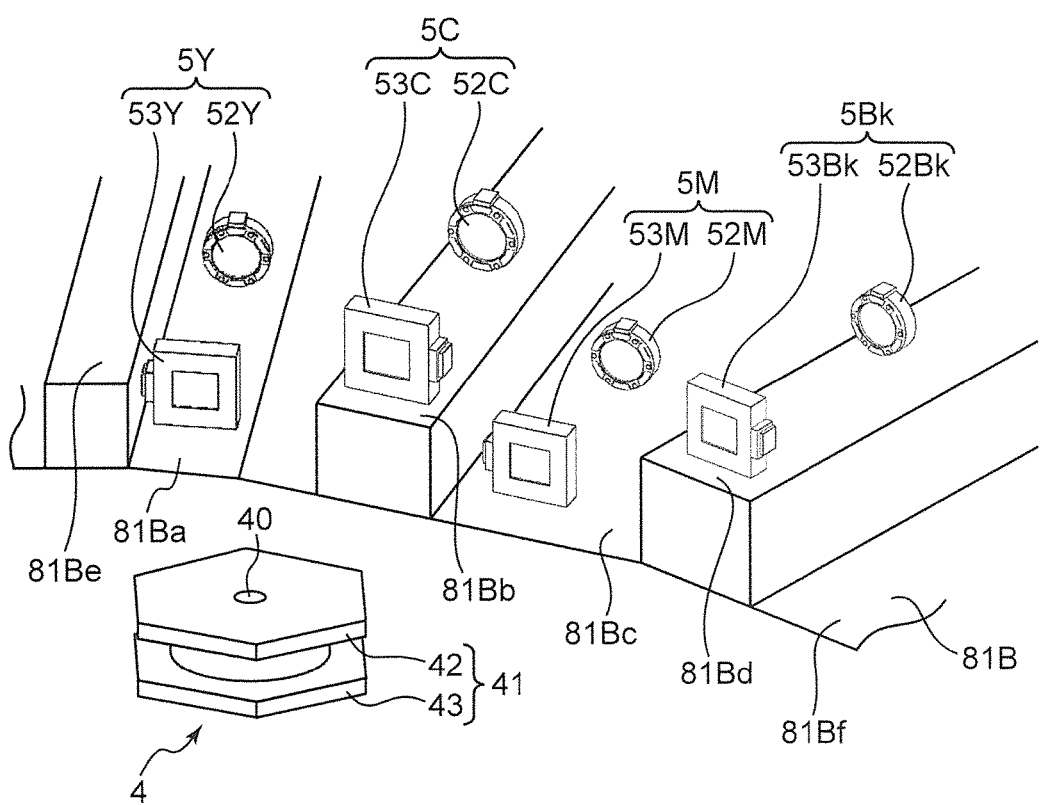
FIG. 6 is a perspective view showing a second example of the configuration of the area of the principal surface of the base part of the optical housing where the incident optical systems are arranged.

FIG. 6 is a perspective view showing a second example of the configuration of the second area 81B, where the respective incident optical systems 5Y, 5C, 5M and 5Bk are arranged, on the principal surface 81 of the base part 80. In the example shown in FIG. 6, in the optical housing 8, the second area 81B of the principal surface 81 of the base part 80 includes a first adjacent area part 81Be outward of and adjacent to the first area part 81Ba and a second adjacent area part 81Bf outward of and adjacent to the fourth area part 81Bb in addition to the first, second, third and fourth area parts 81Ba, 81Bb, 81Bc and 81Bd described above.

In the second area 81B of the principal surface 81 of the base part 80, the first adjacent area part 81Be is at the same vertical position as the second area part 81Bb, and the second adjacent area part 81Bf is at the same vertical position as the third area part 81Bc. In this embodiment, the first adjacent area part 81Be is located higher than the first area part 81Ba and the second adjacent area part 81Bf is located lower than the fourth area part 81Bd to correspond to the formation of the first and third area parts 81Ba, 81Bc located lower than the second and fourth area parts 81Bb, 81Bd formed a the projecting parts. Specifically, the first adjacent area part 81Be is formed as a projecting part protecting upward from the principal surface 81 and extending straight along a radial direction of the polygon motor 4, and the second adjacent area part 81Bf is formed on the principal surface 81. Further, the first adjacent area part 81Be formed as the projecting part has the same shape as the second and fourth area parts 81Bb, 81Bd. Specifically, the first adjacent area part 81Be has the same length in a longitudinal direction, length in a width direction perpendicular to the longitudinal direction, projecting height and cross-sectional shape perpendicular to the longitudinal direction as the second and fourth area parts 81Bb, 81Bd.

In the second area 81B of the principal surface 81 of the base part 80, the first and second adjacent area parts 81Be, 81Bf are provided adjacent to the first and fourth area parts 81Ba, 81Bd on outermost sides in an area part where the respective incident optical systems 5Y, 5C, 5M and 5Bk are arranged. For example, if the first and third area parts 81Ba, 81Bc are focused in the second area 81B of the principal surface 81 of the base part 80, either area part is configured to be sandwiched between the area parts formed as the projecting parts projecting upward from the principal surface 81 and having the same shape. By such a configuration, a thermal deformation difference of the second area 81B, where the respective incident optical systems 5Y, 5C, 5M and 5Bk are arranged, on the principal surface 81 of the base part 80 can be made small. Thus, the deterioration of optical scanning characteristics due to the thermal deformation of the optical housing 8 can be suppressed.

The invention claimed is:
1. An optical scanning device for scanning peripheral surfaces of a first photoconductive drum, a second photoconductive drum, a third photoconductive drum and a fourth photoconductive drum rotating about drum rotary shafts with light beams, comprising:
 a casing including a base part having a principal surface parallel to the drum rotary shafts; and
 a polygon mirror arranged in a first area on the principal surface of the base part, including a mirror rotary shaft extending in a direction perpendicular to the principal surface, a first deflection surface and a second deflection surface, first and second light beams being incident on the first deflection surface at the same timing, third and fourth light beams being incident on the second deflection surface at the same timing, and configured to scan the peripheral surfaces of the respective first and second photoconductive drums in a first main scanning direction by reflecting the first and second light beams in a first reflecting direction and scan the peripheral surfaces of the respective third and fourth photoconductive drums in a second main scanning direction opposite to the first main scanning direction by reflecting the third and fourth light beams in a second reflecting direction opposite to the first reflecting direction while rotating about the motor rotary shaft;

incident optical systems arranged in a second area outside the first area in the first or second main scanning direction on the principal surface of the base part, the incident optical systems including a first incident optical system configured to cause the first light beam to be incident at a first incident open angle on the first deflection surface, a second incident optical system arranged adjacent to the first incident optical system and configured to cause the second light beam to be incident at a second incident open angle larger than the first incident open angle on the first deflection surface, a third incident optical system arranged adjacent to the second incident optical system on a side opposite to the first incident optical system and configured to cause the third light beam to be incident at a third incident open angle equal to the second incident open angle on the second deflection surface, and a fourth incident optical system arranged adjacent to the third incident optical system on a side opposite to the second incident optical system and configured to cause the fourth light beam to be incident at a fourth incident open angle equal to the first incident open angle on the second deflection surface;

a first scanning lens arranged in a third area outside the first area in the first reflecting direction on the principal surface of the base part and extending along the first main scanning direction, the first scanning lens including a first lens section configured to cause the first light beam reflected by the polygon mirror to be imaged on the peripheral surface of the first photoconductive drum and a second lens section configured to cause the second light beam reflected by the polygon mirror to be imaged on the peripheral surface of the second photoconductive drum, the first scanning lens being formed by vertically overlapping the first and second lens sections in such a manner as to separate lens centers of the first and second lens sections by a first distance in the first main scanning direction;

a second scanning lens arranged in a fourth area outside the first area in the second reflecting direction on the principal surface of the base part and extending along the second main scanning direction, the second scanning lens including a third lens section configured to cause the third light beam reflected by the polygon mirror to be imaged on the peripheral surface of the third photoconductive drum and a fourth lens section configured to cause the fourth light beam reflected by the polygon mirror to be imaged on the peripheral surface of the fourth photoconductive drum, the second scanning lens being formed by vertically overlapping the third and fourth lens sections in such a manner as to separate lens centers of the third and fourth lens sections by a second distance equal to the first distance in the second main scanning direction;

a vertical positional relationship of the first lens section with the second lens section being the same as that of the third lens section with the fourth lens section; and a separating direction of the first lens section from the second lens section along the main scanning direction being opposite to a separating direction of the third lens section from the fourth lens section along the main scanning direction.

2. An optical scanning device according to claim 1, wherein:

lens centers of the first and second lens sections are separated by a third distance in the first reflecting direction;

lens centers of the third and fourth lens sections are separated by a fourth distance equal to the third distance in the second reflecting direction; and a separating direction of the first lens section from the second lens section along the reflecting direction is the same as a separating direction of the third lens section from the fourth lens section along the reflecting direction.

3. An optical scanning device according to claim 2, wherein:

a first area part where the first incident optical system is arranged and a second area part where the second incident optical system is arranged are different in vertical position and a third area part where the third incident optical system is arranged and a fourth area part where the fourth incident optical system is arranged are different in vertical position in the second area of the principal surface of the base part;

a vertical positional relationship of the first area part with the second area part is the same as a vertical positional relationship of the first lens section with the second lens section; and a vertical positional relationship of the third area part with the fourth area part is the same as a vertical positional relationship of the third lens section with the fourth lens section.

4. An optical scanning device according to claim 3, wherein:

the second area of the principal surface of the base part includes a first adjacent area part outward of and adjacent to the first area part and a second adjacent area part outward of and adjacent to the fourth area part;

the first adjacent area part and the second area part are at the same vertical position; and the second adjacent area part and the third area part are at the same vertical position.

5. An optical scanning device according to claim 1, wherein:

the first and second lens sections are integrally formed; and the third and fourth lens sections are integrally formed.

6. An image forming apparatus, comprising:

a first photoconductive drum, a second photoconductive drum, a third photoconductive drum and a fourth photoconductive drum configured to rotate about drum rotary shafts; and an optical scanning device according to claim 1 configured to irradiate peripheral surfaces of the first, second, third and fourth photoconductive drums with light beams.

* * * * *